US012706380B2

(12) United States Patent
Jian et al.

(10) Patent No.: US 12,706,380 B2
(45) Date of Patent: Aug. 11, 2026

(54) ADVANCED ANTENNA ARCHITECTURE WITH LOW PIM

(71) Applicant: Telefonaktiebolaget LM Ericsson (publ), Stockholm (SE)

(72) Inventors: Chunyun Jian, Ottawa (CA); Mi Zhou, Nepean (CA); Zhen Hong Wang, Stittsville (CA); Edward Sich, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 18/286,589

(22) PCT Filed: Apr. 21, 2021

(86) PCT No.: PCT/IB2021/053298

§ 371 (c)(1),
(2) Date: Oct. 12, 2023

(87) PCT Pub. No.: WO2022/224014

PCT Pub. Date: Oct. 27, 2022

(65) Prior Publication Data

US 2024/0195061 A1 Jun. 13, 2024

(51) Int. Cl.
*H01Q 3/36* (2006.01)
*H01Q 21/00* (2006.01)

(52) U.S. Cl.
CPC ........... *H01Q 3/36* (2013.01); *H01Q 21/0006* (2013.01)

(58) Field of Classification Search
CPC ............................ H01Q 21/0006; H01Q 3/36
See application file for complete search history.

(56) References Cited

U.S. PATENT DOCUMENTS 6,329,949 B1 12/2001 Barnett et al.
11,081,777 B2 8/2021 Kim et al.
(Continued)

FOREIGN PATENT DOCUMENTS

CN 110777462 A * 2/2020 ............... D02G 3/04
CN 110911837 A * 3/2020 ........... H01Q 19/104
(Continued)

OTHER PUBLICATIONS

International Search Report and Written Opinion for International Patent Application No. PCT/IB2020/053456, mailed Jun. 17, 2020, 12 pages.

(Continued)

*Primary Examiner* — Resha Desai
*Assistant Examiner* — Peter Davon Doze
(74) *Attorney, Agent, or Firm* — Sonoda & Kobayashi Intellectual Property Law; Sarvajit S. Patil

(57) ABSTRACT

Embodiments of an Antenna and Filter Unit (AFU) for an Advanced Antenna System (AAS) are disclosed herein. In one embodiment, an AFU for an AAS comprises a first unit and a second unit. The first unit comprises a 1:N power splitter comprising an input coupled, directly or indirectly, to an antenna port of the AFU and N outputs, where N≥2. The first unit also comprises N first board-to-board type connectors electrically connected to the N outputs of the 1:N power splitter, respectively. The second unit comprises N second board-to-board type connectors configured to be electrically coupled to the N first board-to-board type connectors, respectively, and N antenna elements coupled, directly or indirectly, to the N second board-to-board connectors, respectively. By positioning the 1:N power splitter prior to the N first and N second board-to-board type connectors, input power at each of the board-to-board type connectors is reduced, which thereby reduces Passive Intermodulation.

8 Claims, 13 Drawing Sheets

(56) References Cited

U.S. PATENT DOCUMENTS

| | | | | |
|---|---|---|---|---|
| 2008/0316139 | A1* | 12/2008 | Blaser | H01Q 21/0037 343/904 |
| 2012/0293279 | A1 | 11/2012 | Gong et al. | |
| 2015/0139352 | A1* | 5/2015 | Matsuo | H04B 17/12 375/295 |
| 2018/0048043 | A1 | 2/2018 | Park et al. | |
| 2019/0081407 | A1 | 3/2019 | Doudou et al. | |
| 2019/0268046 | A1 | 8/2019 | Kim et al. | |
| 2019/0348734 | A1 | 11/2019 | Kim et al. | |
| 2020/0028237 | A1 | 1/2020 | Kim et al. | |
| 2020/0313285 | A1 | 10/2020 | Chu et al. | |
| 2021/0336659 | A1 | 10/2021 | Kim et al. | |
| 2022/0173526 | A1 | 6/2022 | Da Silveira et al. | |
| 2022/0294108 | A1 | 9/2022 | Zhang et al. | |

FOREIGN PATENT DOCUMENTS

| | | | |
|---|---|---|---|
| CZ | 2002108 | A3 | 10/2002 |
| EP | 3361566 | A1 | 8/2018 |
| EP | 3751665 | A1 | 12/2020 |
| KR | 20180089265 | A | 8/2018 |
| WO | 2019047091 | A1 | 3/2019 |
| WO | 2020212819 | A1 | 10/2020 |

OTHER PUBLICATIONS

Written Opinion for International Patent Application No. PCT/IB2020/053456, mailed Mar. 12, 2021, 7 pages.

International Preliminary Report on Patentability for International Patent Application No. PCT/IB2020/053456, dated Jun. 16, 2021, 19 pages.

International Search Report and Written Opinion for International Patent Application No. PCT/IB2021/053298, mailed Jan. 10, 2022, 13 pages.

Notice of Allowance for U.S. Appl. No. 17/599,144, mailed Jul. 26, 2023, 9 pages.

* cited by examiner

ADVANCED ANTENNA ARCHITECTURE WITH LOW PIM

This application is a 35 U.S.C. § 371 national phase filing of International Application No. PCT/IB2021/053298, filed Apr. 21, 2021, the disclosure of which is incorporated herein by reference in its entirety.

TECHNICAL FIELD

The present disclosure relates to an advanced antenna architecture.

BACKGROUND

The Antenna Filter Unit (AFU) is a large physical component of an Advanced Antenna System (AAS) for both Frequency Division Duplexing (FDD) and Time Division Duplexing (TDD) wireless communication systems such as, for example, a FDD or TDD Third Generation Partnership Project (3GPP) Long Term Evolution (LTE) or New Radio (NR) system. FIG. 1A illustrates one example of an existing AFU, which is denoted AFU 100. As illustrated, the AFU 100 includes an antenna unit 102 and a filter unit 104. The antenna unit 102 includes an Antenna and Filter Support (AFS) 106 that supports the other elements of the antenna unit 102 and the filter unit 102 mechanically. The antenna unit 102 also includes an antenna Printed Circuit Board (PCB) 108 which may include various electrical components such as, e.g., phase shifters for antenna beam tilting, Radio Frequency (RF) power dividers/combiners for antenna sub-array function, feedback circuits for antenna calibration, etc. The antenna unit 102 also includes an antenna backplate 110, multiple antenna elements 112, and a radome 14. The antenna unit 102 includes multiple board-to-board connectors 116 (also referred to herein as "board-to-board type connectors") for electrically connecting the antenna unit 102, and more specifically the antenna PCB 108, to the filter unit 102. The filter unit 102 includes a filter bank 118 and multiple board-to-board connectors 120 for electrically connecting the filter bank 118 to the antenna unit 102 and, more specifically, to the antenna PCB 108. The board-to-board connectors 116 of the antenna unit 102 are electrically connected to the board-to-board connectors 120 of the filter unit 104 via respective electrically conductive posts 122 that pass through respective openings 124 in the antenna unit 102 and respective openings 126 in the filter unit 104. FIG. 1B is an exploded view of the AFU 100.

The connections formed by the board-to-board connectors 116 of the antenna unit 102, the board-to-board connectors 120 of the filter unit 104, and the electrically conductive posts 122 are a primary source of Passive Inter-Modulation (PIM) distortion in the AFU. This PIM may, in some cases, not be low enough to meet AAS radio requirements due to higher transmit power. This PIM is one of the most significant factors to cause AAS radio failure at the last step of radio assembly. Thus, there is a need to reduce the PIM caused by the connections formed by the board-to-board connectors 116 of the antenna unit 102, the board-to-board connectors 120 of the filter unit 104, and the electrically conductive posts 122.

SUMMARY

Embodiments of an Antenna and Filter Unit (AFU) for an Advanced Antenna System (AAS) are disclosed herein. In one embodiment, an AFU for an AAS comprises a first unit and a second unit. The first unit comprises a 1:N power splitter comprising an input coupled, directly or indirectly, to an antenna port of a filter and N outputs, where N≥2. The first unit also comprises N first board-to-board type connectors electrically connected to the N outputs of the 1:N power splitter, respectively. The second unit comprises N second board-to-board type connectors configured to be electrically coupled to the N first board-to-board type connectors, respectively, and N antenna elements coupled, directly or indirectly, to the N second board-to-board connectors, respectively. By positioning the 1:N power splitter prior to the N first and N second board-to-board type connectors, input power at each of the board-to-board type connectors is reduced, which thereby reduces Passive Intermodulation (PIM).

In one embodiment, the first unit is a filter unit comprising the filter having an input electrically coupled to an input port of the AFU and the antenna port coupled to the input of the 1:N power splitter. The filter unit further comprises a filter printed circuit board (PCB) comprising the 1:N power splitter where an output of the filter is electrically coupled to the input of the 1:N power splitter. The second unit is an antenna unit. In one embodiment, the antenna unit further comprises N signal paths connected between the respective ones of the N second board-to-board connectors and the N antenna elements. Each signal path comprises a phase shifter circuit having an input electrically coupled to a respective one of the N outputs of the 1:N power splitter and an output electrically coupled to a respective one of the N first board-to-board type connectors. In one embodiment, the antenna unit further comprises a radome, an antenna PCB comprising the N signal paths, an antenna backplate, and an antenna filter support that mechanically connects the antenna unit and the filter unit.

In one embodiment, the first unit comprises a filter unit comprising a filter having an input electrically coupled to the antenna port of the AFU and a PCB comprising the 1:N power splitter, wherein the input of the 1:N power splitter is configured to be electrically coupled to an output of the filter. The second unit is an antenna unit. In one embodiment, the PCB further comprises a phase shifter circuit comprising a first terminal configured to be electrically coupled to an output of the filter and a second terminal coupled to the input of the 1:N power splitter. In one embodiment, the antenna unit further comprises a radome, an antenna backplate, and an antenna filter support that mechanically connects the antenna unit, the PCB, and the filter unit.

In one embodiment, the AFU further comprises N removable electrically conducting bullets configured to electrically couple the N first board-to-board type connectors and the N second board-to-board type connectors, respectively. In one embodiment, electrical connections formed by the N removable electrically conducting bullets, the N first board-to-board type connectors, and the N second board-to-board type connectors are a primary source of PIM distortion in the AAS.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Systems and methods are disclosed herein for reducing Passive Intermodulation (PIM) distortion in an Antenna and Filter Unit (AFU) for an Advanced Antenna System (AAS). As such, using embodiments of the present disclosure, the yield when manufacturing AASs can be substantially improved as a result of a substantial reduction of the number of AAS that fail at the final stage of manufacturing due to PIM.

Figure 1A:
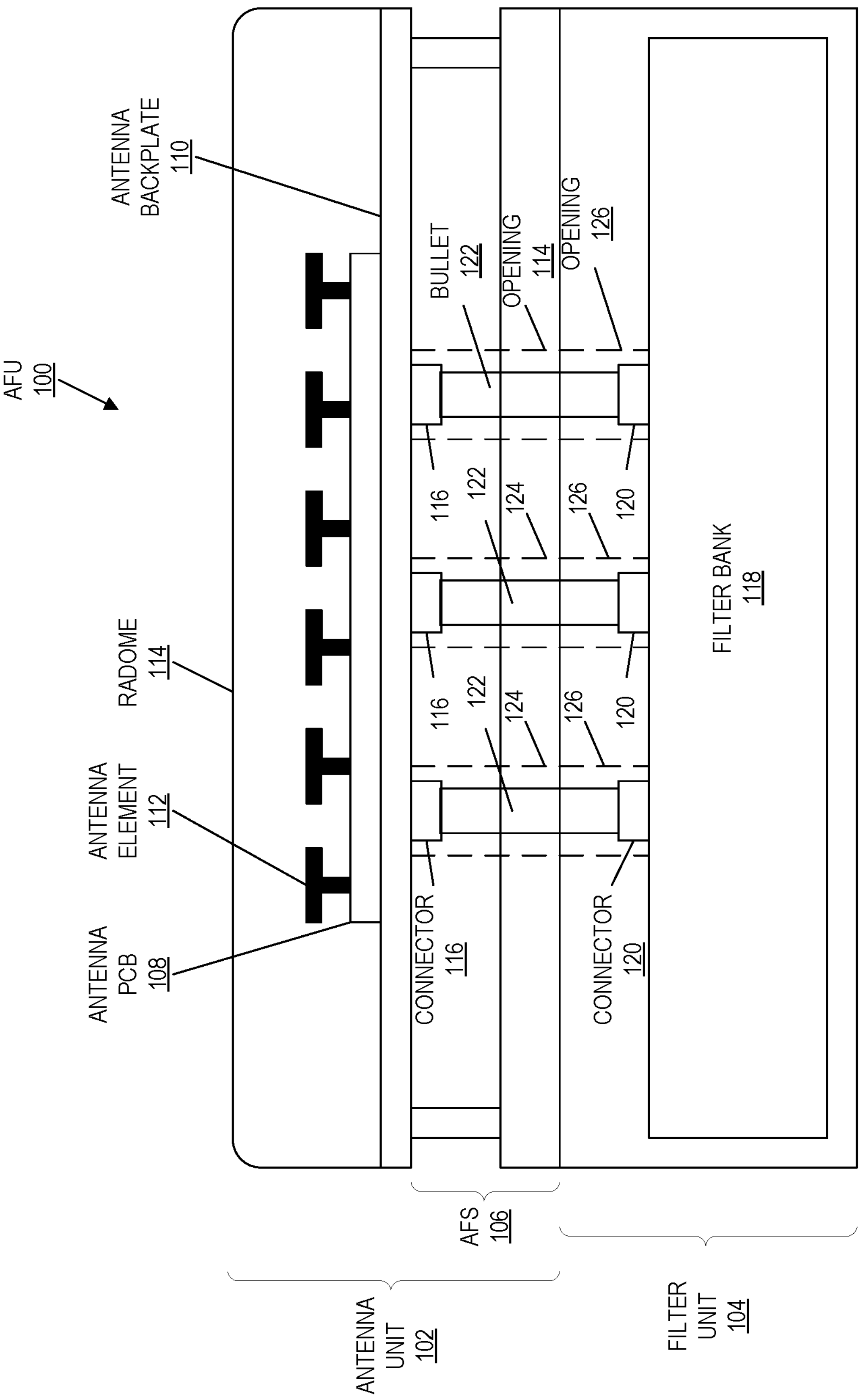
FIGS. 1A and 1B illustrate one example of an existing Antenna and Filer Unit (AFU) for an Advanced Antenna System (AAS)
Figure 1B:
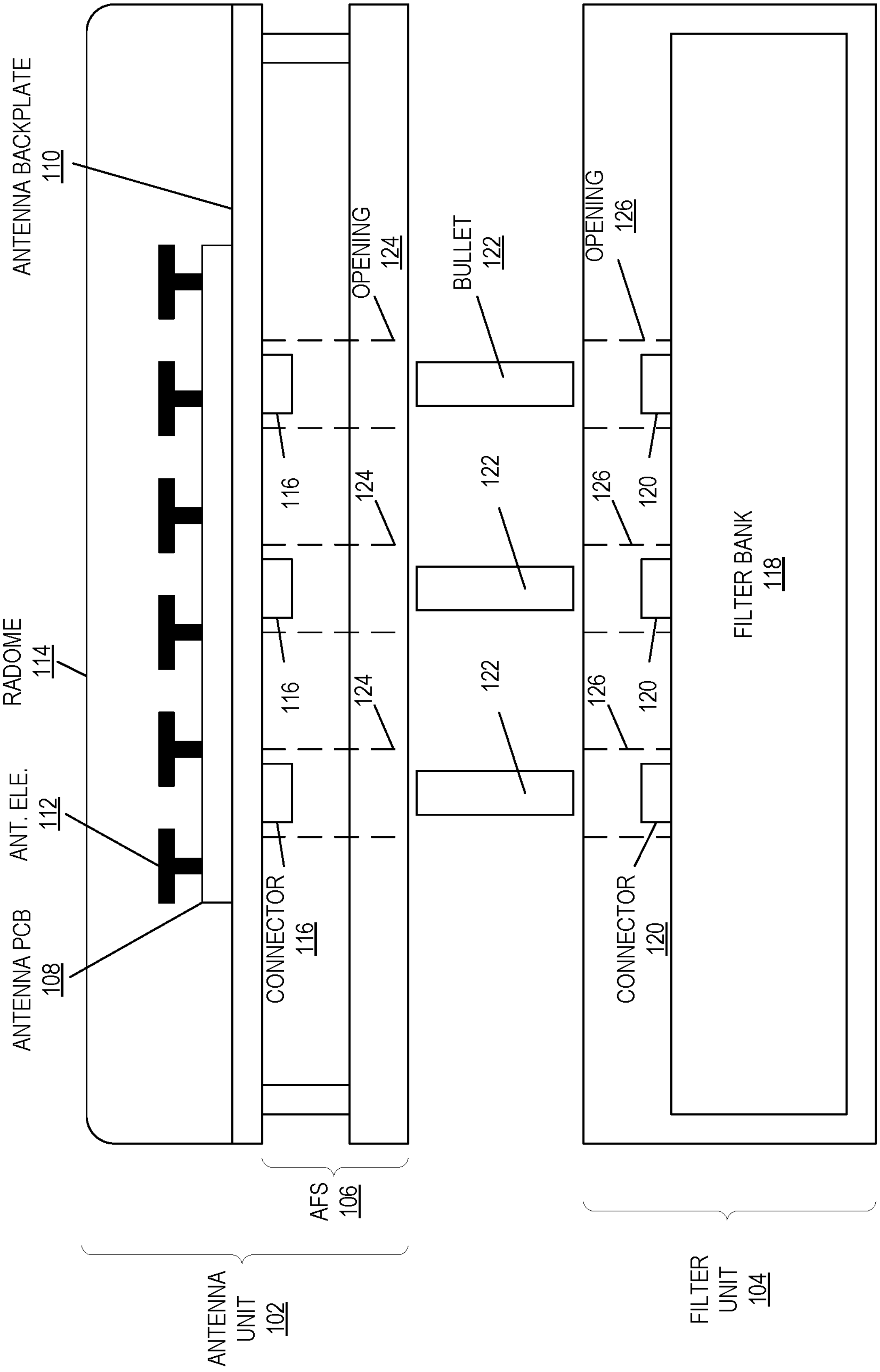
Figure 2:
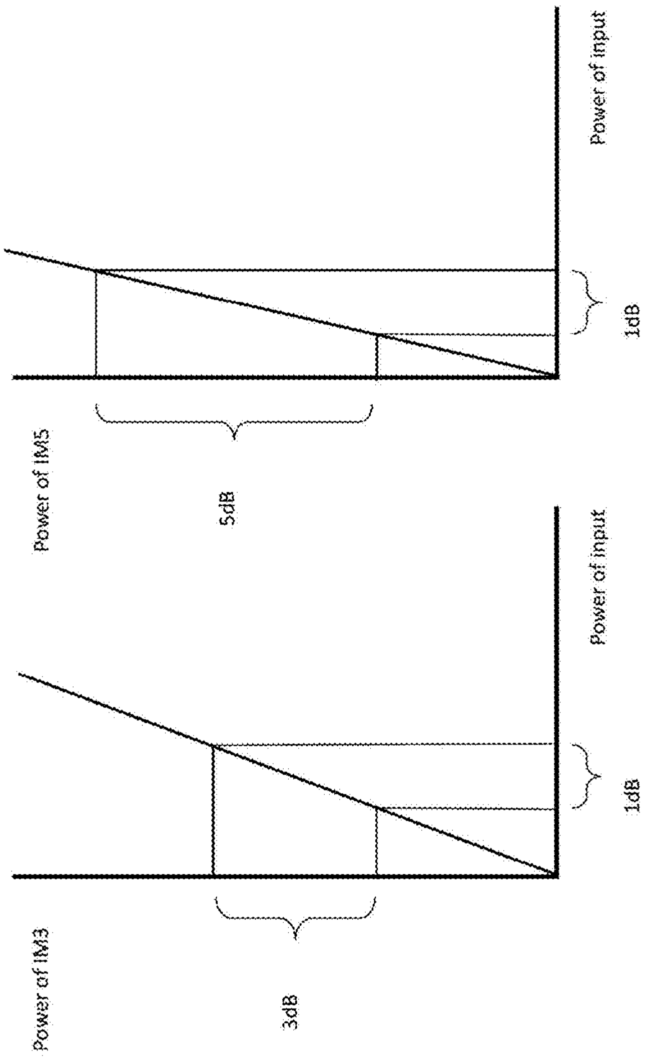
FIG. 2 shows relationship between $3^{rd}$ order Intermodulation (IM3), which is the most significant component of Passive Intermodulation (PIM), and input power as well as the relationship between $5^{th}$ order Intermodulation (IM5), which is the second most significant component of the PIM, and input power.

Before describing embodiments of the present disclosure, a discussion of the PIM in the existing AFU 100 of FIGS. 1A and 1B is beneficial. The power of the PIM generated by the connections formed by the board-to-board connectors 116 of the antenna unit 102, the board-to-board connectors 120 of the filter unit 104, and the electrically conductive posts 122 is related to the input power at these connections. In particular, FIG. 2 shows relationship between $3^{rd}$ order Intermodulation (IM3), which is the most significant component of the PIM, and input power as well as the relationship between $5^{th}$ order Intermodulation (IM5), which is the second most significant component of the PIM, and input power. As can be seen from FIG. 2, for any 1 decibel (dB) decrease in the input power, the power of the IM3 decreases by 3 dB. Similarly, for any 1 dB decrease in the input power, the power of the IM5 decreases by 5 dB. These theoretical relationships have proved to be very close to actual results of the PIM measurements. Thus, the PIM of an AFU can be decreased by decreasing the input power at the board-to-board connections.

Figure 3:
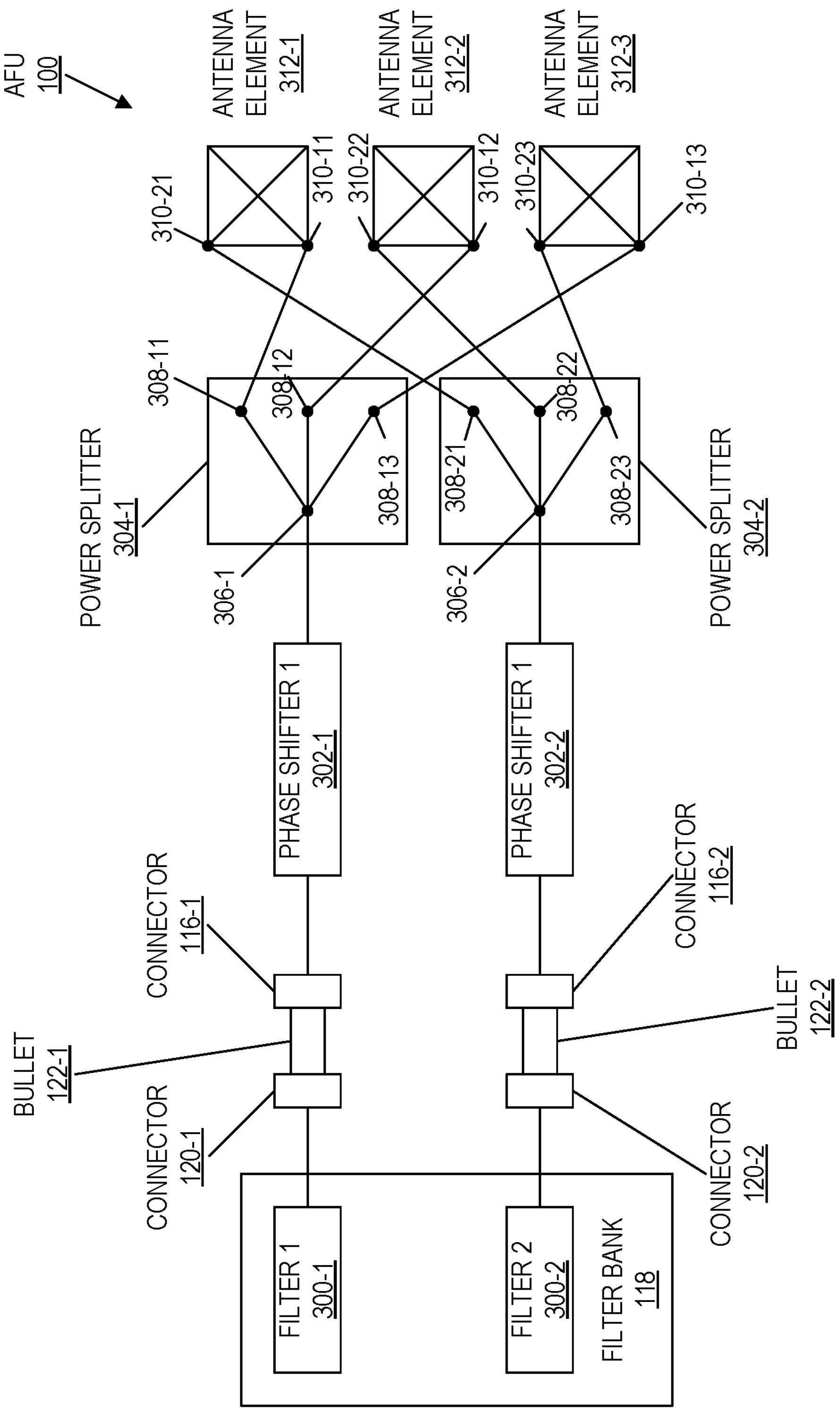
FIG. 3 is a signal diagram of the AFU of FIGS. 1A and 1B.

Since almost all AAS radio designs use antenna sub-arrays for beam forming, power dividers/combiners are necessary components for feeding the individual antenna elements of the antenna sub-arrays. This can be seen in the signal diagram of the AFU 100 shown in FIG. 3. As shown in FIG. 3 for an example of the AFU 100 in which there are two antenna branches (also referred to herein as transmit or receive branches), filters 300-1 and 300-2 in the filter bank 118 are connected to the antenna unit 102 via respective connections formed by the board-to-board connectors 120-1 and 120-2 of the filter unit 104, the board-to-board connectors 116 of the antenna unit 102, and the electrically conducting posts 122-1 and 122-2. In the antenna unit 102, the board-to-board connectors 116-1 and 116-2 are connected to phase shifters 302-1 and 302-2, respectively. The phase shifters 302-1 and 302-2 are then connected to power splitters/combiners 304-1 and 304-2. More specifically, the phase shifters 302-1 and 302-2 are connected to combined ports 306-1 and 306-2 of the power splitters/combiners 304-1 and 304-2, respectively. Considering the transmit direction, the input power of the signal presented at the combined port 306-1 of the power splitter/combiner 304-1 is split, or divided, to provide corresponding reduced power signals at the split ports 308-11 to 308-13 of the power splitter/combiner 304-1. In this example, there are three split ports 308-11 to 308-13 such that the power at each of the split ports 308-11 to 308-13 is one-third of the input power at the combined port 306-1 of the power splitter/combiner 304-1 (i.e., 4.77 dB lower than the input power at the combined power 306-1). Likewise, the input power of the signal presented at the combined port 306-2 of the power splitter/combiner 304-2 is split, or divided, to provide corresponding reduced power signals at the split ports 308-21 to 308-23 of the power splitter/combiner 304-2.

Thus, in accordance with embodiments of the present disclosure, the input power of the board-to-board connections of an AFU is reduced by modifying the architecture of the AFU such that the power splitters/combiners are, considering the transmit direction, positioned before the board-to-board connections. For example, the board-to-board connections may be positioned immediately following the split ports (i.e., the output ports), considering the transmit direction. Considering power splitters/dividers having a 1:3 dividing/combining function, this results in a 4.77 dB decrease in the input power at these connections, which in turn provides a decrease of 3×4.77 dB=14.31 dB for IM3 and a decrease of 5×4.77 dB=23.85 dB for IM5. This is a huge decrease in PIM as compared to the existing AFU 100 of FIGS. 1A and 1B.

Tables 1A and 1B below show powers of IM3, IM5, and $7^{th}$ order Inter-Modulation (IM7) in various cases of the power dividers, where $Pim_{30}$, $Pim_{50}$, and $Pim_{70}$ are the powers of the IM3, IM3, and IM7 in the case of 1:1 power dividing which means a non-power-splitting case and corresponds to the case shown in FIG. 3 where the board-to-board connectors are placed right after the filters 300. Tables 1A and 1B show the reduction (in dB) of the IM3, IM5, and IM7 power resulting from positioning the board-to-board connectors right after the output (split) ports of the power splitters compared to the case in which the board-to-board connectors are positioned right after the filters 300. Clearly, the larger the splitting number of the power splitters, the higher the reduction of the IM3, IM5, and IM7 power components of the PIM.

TABLE 1A

| Power divider | 1:1 | 1:2 | 1:3 | 1:4 | 1:5 |
|---|---|---|---|---|---|
| IM3 (dB) | $P_{im30}$ | $P_{im30}$ − 9 | $P_{im30}$ − 14.3 | $P_{im30}$ − 18 | $P_{im30}$ − 21 |
| IM5 (dB) | $P_{im50}$ | $P_{im50}$ − 15 | $P_{im50}$ − 23.9 | $P_{im50}$ − 30 | $P_{im50}$ − 34.9 |
| IM7 (dB) | $P_{im70}$ | $P_{im70}$ − 21 | $P_{im70}$ − 33 | $P_{im70}$ − 42 | $P_{im70}$ − 49 |

TABLE 1B

| Power divider | 1:6 | 1:7 | 1:8 | 1:9 | 1:10 |
|---|---|---|---|---|---|
| IM3 (dB) | $P_{im30}$ − 23.3 | $P_{im30}$ − 25.4 | $P_{im30}$ − 27 | $P_{im30}$ − 28.6 | $P_{im30}$ − 30 |
| IM5 (dB) | $P_{im50}$ − 38.9 | $P_{im50}$ − 42.3 | $P_{im50}$ − 45.2 | $P_{im50}$ − 47.7 | $P_{im50}$ − 50 |
| IM7 (dB) | $P_{im70}$ − 54 | $P_{im70}$ − 59 | $P_{im70}$ − 63 | $P_{im70}$ − 67 | $P_{im70}$ − 70 |

Figure 4:
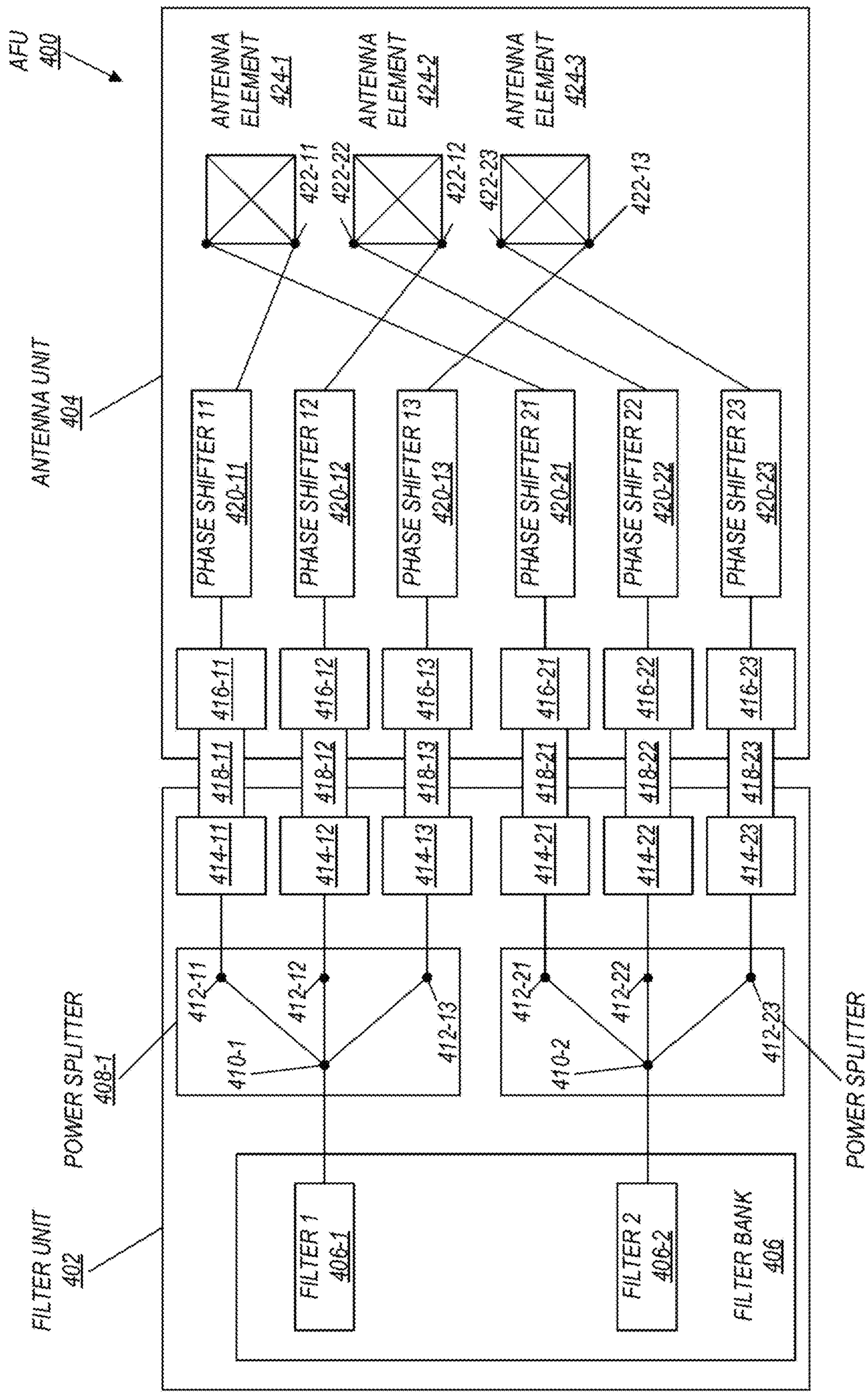
FIG. 4 illustrates one example of an AFU that provides PIM reduction by positioning the 1:N power splitters prior to the board-to-board type connections, thereby reducing power at each board-to-board type connector and thus PIM, in accordance with one embodiment of the present disclosure.

In this regard, FIG. 4 illustrates one example of an AFU 400 in accordance with an embodiment of the present disclosure. FIG. 4 is a signal diagram representation of the AFU 400. Further, in the example of FIG. 4, there are two antenna branches. The description below is given from the transmit perspective and, as such, the two antenna branches are also referred to as transmit branches. As illustrated, the AFU 400 includes a filter unit 402 and an antenna unit 404. The filter unit 402 includes a filter bank 406 including, in this example, filter 406-1 for a first transmit branch and filter 406-2 for a second transmit branch. The filter unit 402 also includes power splitters 408-1 and 408-2 for the first and second transmit branches, respectively. The power splitters 408-1 and 408-2 are each 1:N power splitters, where in the example of FIG. 4 N=3. An input port 410-1 (also referred to herein as a combined port) of the power splitter 408-1 is electrically coupled to the filter 406-1. Output ports 412-11 to 412-13 of the power splitter 408-1 are electrically coupled to board-to-board connectors 414-11 to 414-13 of the filter unit 402, respectively. Likewise, an input port 410-2 of the power splitter 408-2 is electrically coupled to the filter 406-2. Output ports 412-21 to 412-23 of the power splitter 408-2 are electrically coupled to board-to-board connectors 414-21 to 414-23 of the filter unit 402, respectively. By positioning the power splitter 408-1 before the board-to-board connectors 414-11 to 414-13 in the direction of propagation of the transmit signal in the first transmit branch and positioning the power splitter 408-2 before the board-to-board connectors 414-21 to 414-23 in the direction of propagation of the transmit signal in the second transmit branch, the input power each individual board-to-board connector is reduced, in this example, by 4.77 dB as compared to the input power of each individual board-to-board connector in the existing AFU 100 of FIGS. 1A and 1B. As discussed above, this results in a massive reduction in PIM in the AFU 400 as compared to that in the AFU 100 of FIGS. 1A and 1B.

For the first transmit path, the board-to-board connectors 414-11 to 414-13 are electrically connected to board-to-board connectors 416-11 to 416-13 of the antenna unit 404 via respective electrically conducting posts 418-11 to 418-13. In one embodiment, the posts 418-11 to 418-13 are implemented as loose, removable electrically conductive objects that are positioned within respective openings to thereby electrically connect the board-to-board connectors 414-11 to 414-13 to board-to-board connectors 416-11 to 416-13 of the antenna unit 404. Thus, the posts 418-11 to 418-13 are to be distinguished from other types of connectors such as solder, cables, and screws. Again, considering the transmit direction, the board-to-board connectors 418-11 to 418-13 are, in the illustrated example, connected to inputs of respective signal paths including phase shifters 420-11 to 422-13. The outputs of the phase shifters 420-11 to 420-13 are electrically coupled to first ports 422-11 to 422-13 of respective antenna elements 424-1 to 424-3 in a respective antenna sub-array.

Likewise, for the second transmit path, the board-to-board connectors 414-21 to 414-23 are electrically connected to board-to-board connectors 416-21 to 416-23 of the antenna unit 404 via respective electrically conducting posts 418-21 to 418-23. In one embodiment, the posts 418-21 to 418-23 are implemented as loose, removable electrically conductive objects that are positioned within respective openings to thereby electrically connect the board-to-board connectors 414-21 to 414-23 to board-to-board connectors 416-21 to 416-23 of the antenna unit 404. Thus, the posts 418-21 to 418-23 are to be distinguished from other types of connectors such as solder, cables, and screws. Again, considering the transmit direction, the board-to-board connectors 418-21 to 418-23 are, in the illustrated example, connected to inputs of respective signal paths including phase shifters 420-21 to 422-23. The outputs of the phase shifters 420-21 to 420-23 are electrically coupled to second ports 422-21 to 422-23 of the respective antenna elements 424-1 to 424-3 in the respective antenna sub-array. Note that, in this example, the antenna elements 424-1 to 424-3 are dual-polarized antenna elements where the first ports 422-11 to 422-13 of the antenna elements 424-1 to 424-3 are for a first polarization and the second ports 422-21 to 422-23 of the antenna elements 424-1 to 424-3 are for a second polarization.

Figure 5:
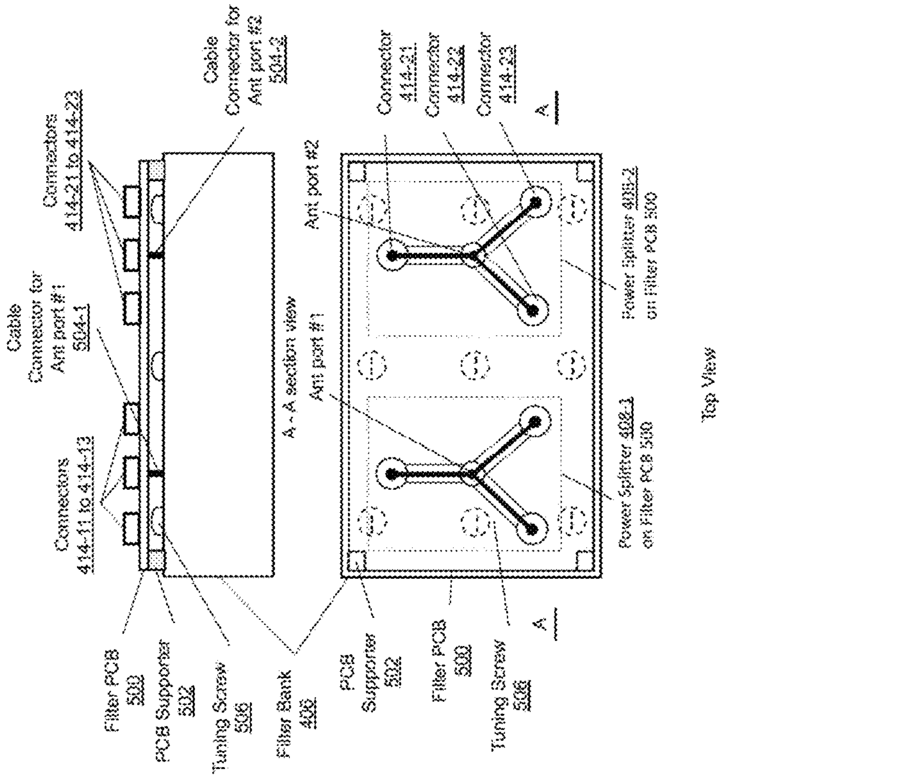
FIGS. 5 and 6 illustrate two example embodiments of the filter unit of the AFU of FIG. 4.
Figure 6:
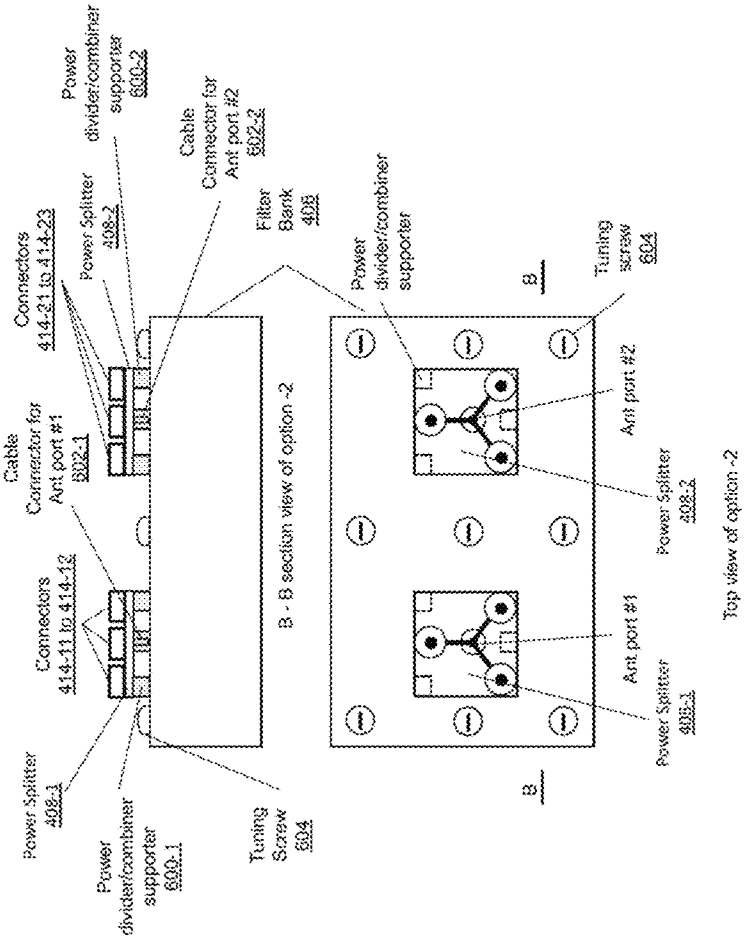

FIGS. 5 and 6 illustrate two example embodiments of the filter unit 402 of FIG. 4. In the example of FIG. 5, the filter unit 402 includes a filter PCB 500 on which the board-to-board connectors 414-11 to 414-13 for the first transmit branch and the board-to-board connectors 414-21 to 414-23 for the second transmit branch are implemented. The filter unit 402 also includes a filter PCB support 502 that mechanically supports the filter PCB 500 on the filter bank 406. The filter 406-1 (not shown) is connected to the filter PCB 502 by, in this example, a first cable connector 504-1, and the filter 406-2 (not shown) is connected to the filter PCB 502 by, in this example, a second cable connector 504-2. The filter bank 406 includes a number of tuning screws 506 to enable tuning of the filters in the filter bank 406. Note that while a single filter PCB 500 is shown in this example, there may be more than one filter PCB, e.g., separate filter PCBs for the power splitters 408-1 and 408-2.

The example of FIG. 6 is similar to that of FIG. 5 but where the power splitters 408-1 and 408-1 are instead implemented as separate modules. More specifically, as illustrated in FIG. 6, the filter unit 402 includes a first power splitter module that implements the power splitter 408-1 and includes the board-to-board connectors 414-11 to 414-13 for the first transmit branch. The first power splitter module is supported by supporter 600-1. The power splitter 408-1 is connected to the filter 406-1 (not shown) via a respective cable connector 602-1. The filter unit 402 also includes a second power splitter module that implements the power splitter 408-2 and includes the board-to-board connectors 414-21 to 414-23 for the second transmit branch. The second power splitter module is supported by supporter 600-2. The power splitter 408-2 is connected to the filter 406-2 (not shown) via a respective cable connector 602-2. The filter unit 402 also includes a number of tuning screws 604 that enable tuning of the filters in the filter bank 406.

Figure 7:
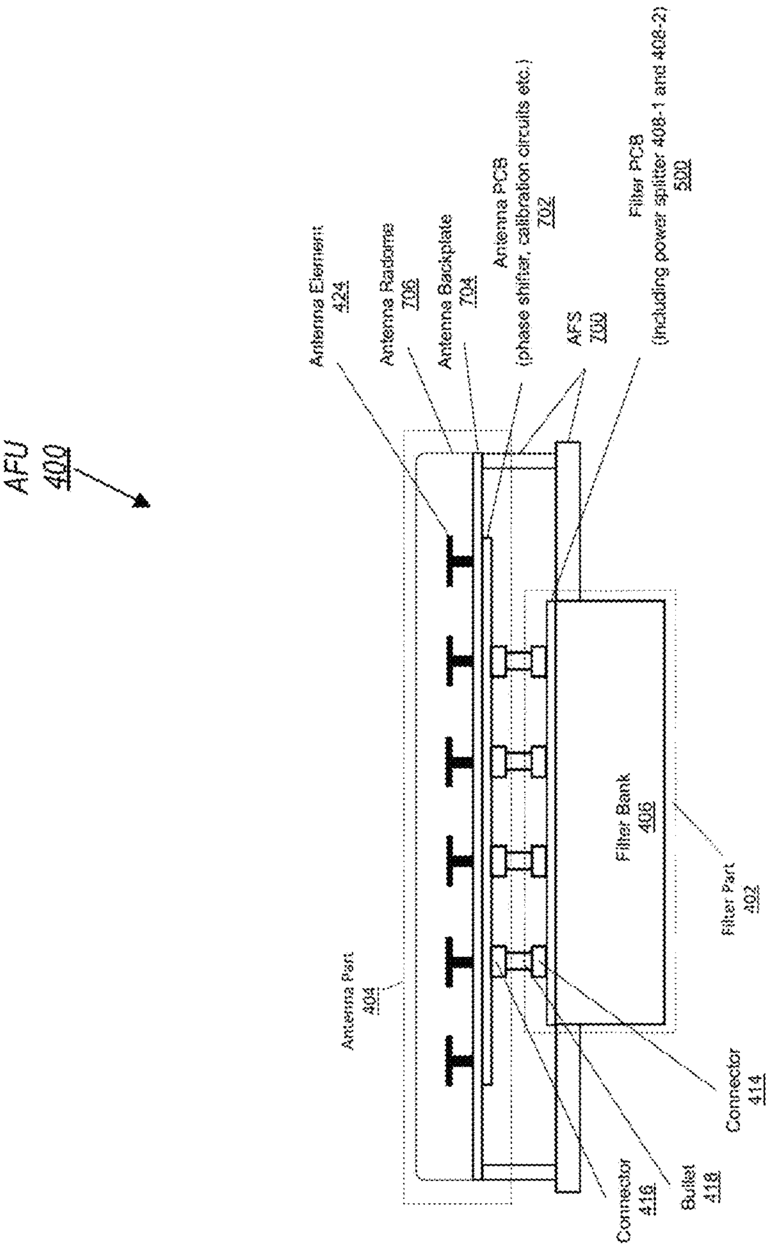
FIG. 7 illustrates a structural view of an example embodiment of the AFU of FIG. 4.

FIG. 7 illustrates a structural view of the AFU 400 in accordance with one example embodiment. As illustrated, the AFU 402 includes the filter unit 402, the antenna unit 404, and an AFS 700 that mechanically supports the filter unit 402 and the antenna unit 404. The filters within the filter bank 406 are connected to the filter PCB 500, e.g., via solder or screw connections and respective cables between antenna ports of the filters and corresponding traces on the filter PCB 500. Since no board-to-board type connections are needed to connect the filters to the filter PCB 500, filter cost savings can be obtained. The antenna unit 404 includes an antenna PCB 702, an antenna backplate 704, the antenna elements 424, and radome 706. The antenna PCB 702 includes the phase shifters 420. The antenna elements 424 are connected to respective traces on the antenna PCB 702, e.g., via solder or screw connections. The board-to-board connectors 418 may be electrically connected to (e.g., via solder or screw) or implemented as part of the antenna PCB 702. The antenna PCB 702 may further include other circuitry such as, for example, feedback circuitry for antenna calibration.

Figure 8:
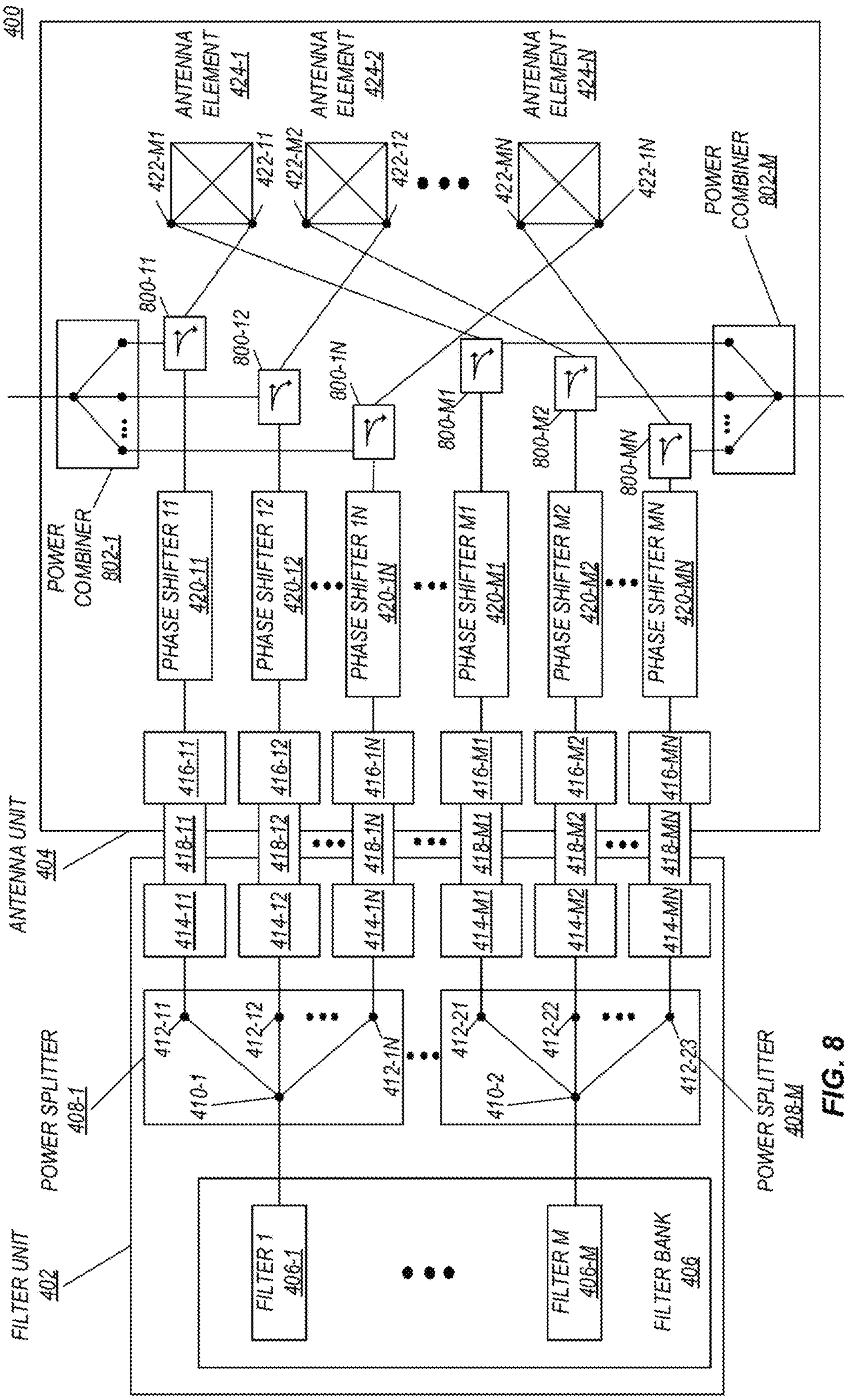
FIG. 8 is a signal diagram representation of the AFU of FIG. 4 in accordance with an embodiment of the present disclosure.

FIG. 8 illustrates is a signal diagram representation of the AFU 400 in accordance with another embodiment of the present disclosure. This example is a generalization of the embodiment of FIG. 4 where there are M antenna branches and each of the phase splitters 408-*m* (for m=1, 2, . . . , M) performs a N way power splitting (i.e., has N split, or output, ports 412-*m*1 to 412-*m*N). Note that "m" is used herein as an antenna, or transmit, branch index and has a value of m=1, . . . , M, and "n" is used herein as a power splitter output port index and has a value of n=1, . . . , N. Optionally, in the embodiment of FIG. 8, the antenna unit 404 further includes couplers 800-11 to 800-MN that couple the outputs of the phase shifters 420-11 to 420-MN to respective power combiners 802-1 to 802-M for feedback to an external component, e.g., for antenna calibration. The couplers 800-11 to 800-MN and the power combiners 802-1 to 802-M are, in one embodiment, implemented in the antenna PCB 702.

Figure 9:
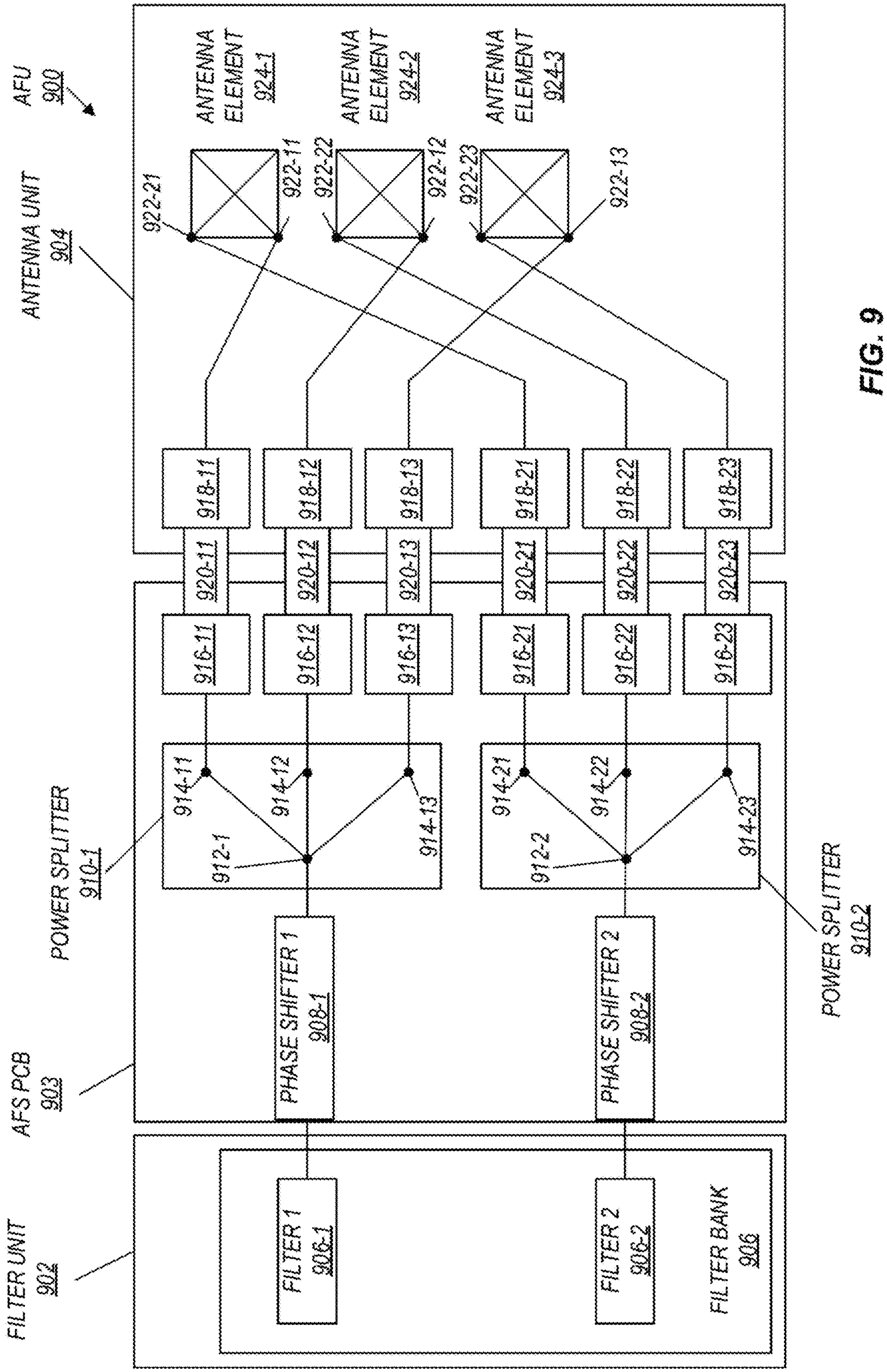
FIG. 9 illustrates one example of an AFU that provides PIM reduction by positioning the 1:N power splitters prior to the board-to-board type connections, thereby reducing power at each board-to-board type connector and thus PIM, in accordance with another embodiment of the present disclosure.

FIG. 9 illustrates an AFU 900 in accordance with another embodiment of the present disclosure. FIG. 9 is a signal diagram representation of the AFU 900. Further, in the example of FIG. 900, there are two antenna branches. The description below is given from the transmit perspective and, as such, the two antenna branches are also referred to as transmit branches. As illustrated, the AFU 900 includes a filter unit 902, an AFS PCB 903, and an antenna unit 904. The filter unit 902 includes a filter bank 906 including, in this example, filter 906-1 for a first transmit branch and filter 906-2 for a second transmit branch.

The AFS PCB 903 includes phase shifters 908-1 and 908-2 having inputs that are electrically coupled to outputs of the filters 906-1 and 906-2, respectively, via, e.g., a low PIM connection such as, e.g., solder or screws. The AFS PCB 903 also includes power splitters 910-1 and 910-2 for the first and second transmit branches, respectively. An input port 1212-1 (also referred to herein as a combined port) of the power splitter 910-1 is electrically coupled to an output of the phase shifter 908-1. Output ports 914-11 to 914-13 of the power splitter 910-1 are electrically coupled to board-to-board connectors 916-11 to 916-13 of the AFS PCB 903, respectively. Likewise, an input port 912-2 of the power splitter 910-2 is electrically coupled to the output of the phase shifter 908-2. Output ports 914-21 to 914-23 of the power splitter 910-2 are electrically coupled to board-to-board connectors 916-21 to 916-23 of the AFS PCB 903, respectively. By positioning the power splitter 910-1 before the board-to-board connectors 916-11 to 916-13 in the direction of propagation of the transmit signal in the first transmit branch and positioning the power splitter 910-2 before the board-to-board connectors 916-21 to 916-23 in the direction of propagation of the transmit signal in the second transmit branch, the input power each individual board-to-board connector is reduced, in this example, by 4.77 dB as compared to the input power of each individual board-to-board connector in the existing AFU 100 of FIGS. 1A and 1B. As discussed above, this results in a massive reduction in PIM in the AFU 400 as compared to that in the AFU 100 of FIGS. 1A and 1B.

For the first transmit path, the board-to-board connectors 916-11 to 916-13 are electrically connected to board-to-board connectors 918-11 to 918-13 of the antenna unit 904 via respective electrically conducting posts 920-11 to 920-13. In one example, the posts 920-11 to 920-13 are implemented as electrically conducting posts. Again, considering the transmit direction, the board-to-board connectors 918-11 to 918-13 are, in the illustrated example, connected to first ports 922-11 to 922-13 of respective antenna elements 924-1 to 924-3 in a respective antenna sub-array. Likewise, the board-to-board connectors 918-21 to 918-23 are, in the illustrated example, connected to second ports 922-21 to 922-23 of the respective antenna elements 924-1 to 924-3 in the respective antenna sub-array. Note that, in this example, the antenna elements 924-1 to 924-3 are dual-polarized antenna elements where the first ports 922-11 to 922-13 of the antenna elements 924-1 to 924-3 are for a first polarization and the second ports 922-21 to 922-23 of the antenna elements 924-1 to 924-3 are for a second polarization.

Figure 10:
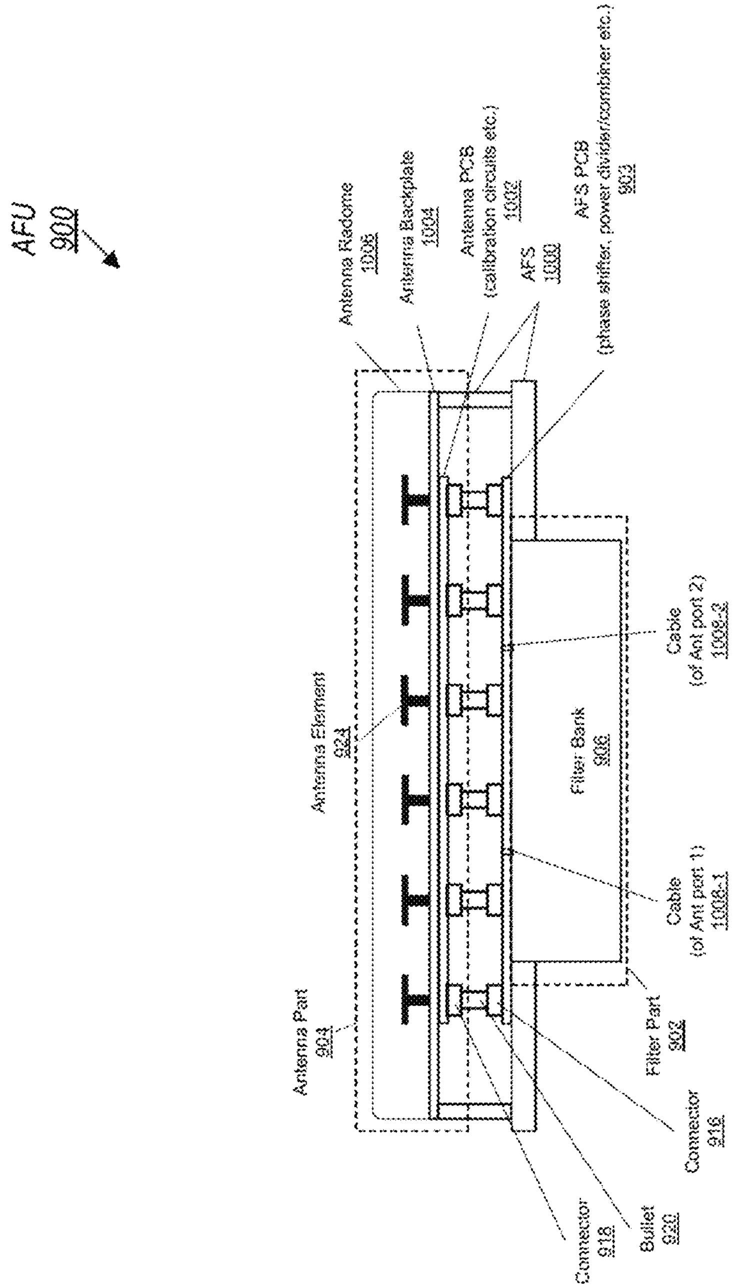
FIG. 10 is a structural diagram of one example embodiment of the AFU of FIG. 9.

FIG. 10 is a structural diagram of one example embodiment of the AFU 900 of FIG. 9. As illustrated, the AFU 900 includes the filter unit 902 including the filter bank 906, an AFS 1000 including the AFS PCB 903, and the antenna unit 904. The AFS 1000 mechanically supports the filter unit 902, the AFS PCB 903, and the antenna unit 904. The antenna unit 904 includes an antenna PCB 1002, an antenna backplate 1004, the antenna elements 924, and radome 1006. The board-to-board connectors 918 are electrically connected to or part of the antenna PCB 1002. The antenna PCB 1002 may include circuitry such as, for example, feedback circuitry for antenna calibration. In this example, cable connectors 1008-1 and 1008-2 connect the filters 906-1 (not shown) and 906-2 (not shown) of the filter bank 906 to the AFS PCB 1002.

Figure 11:
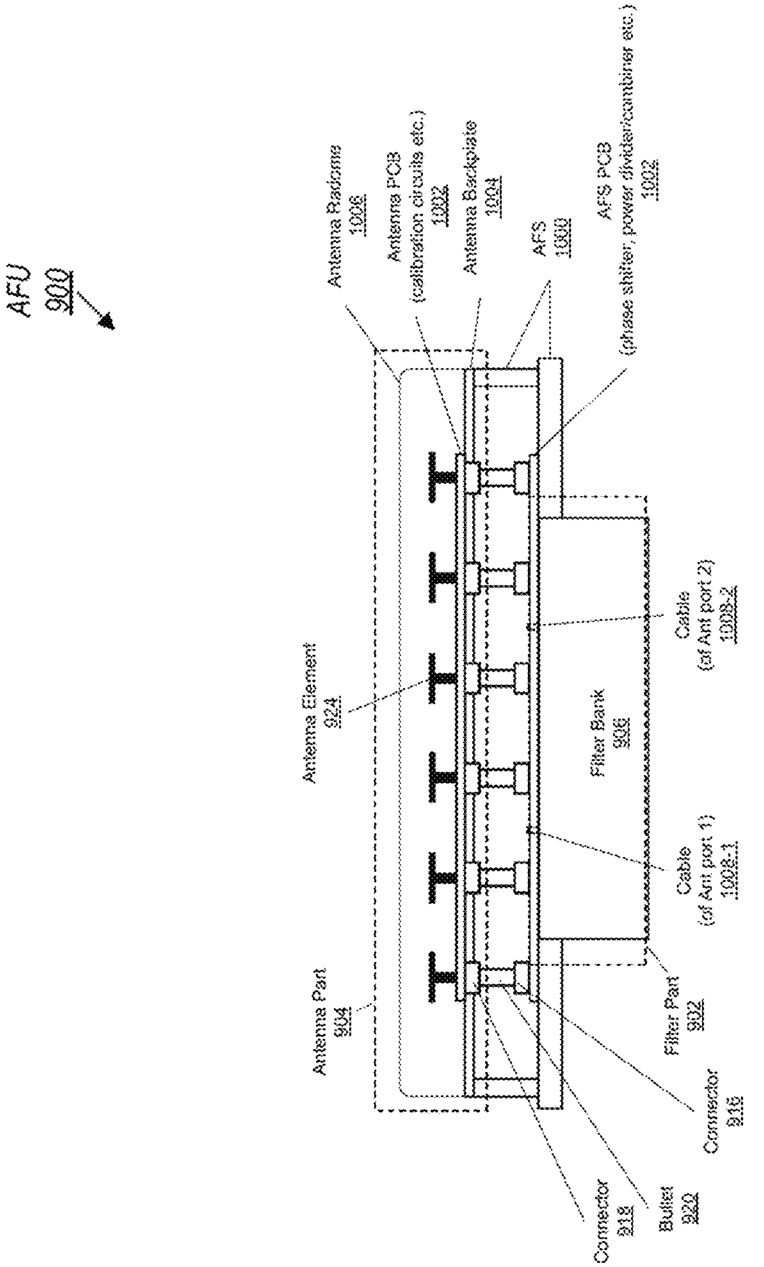
FIG. 11 is a structural diagram of another example embodiment of the AFU of FIG. 9.

FIG. 11 is a structural diagram of one example embodiment of the AFU 900 of FIG. 9. This embodiment is the same as that of FIG. 10 but where the antenna PCB 1002 and the antenna backplate 1004 are reversed.

Figure 12:
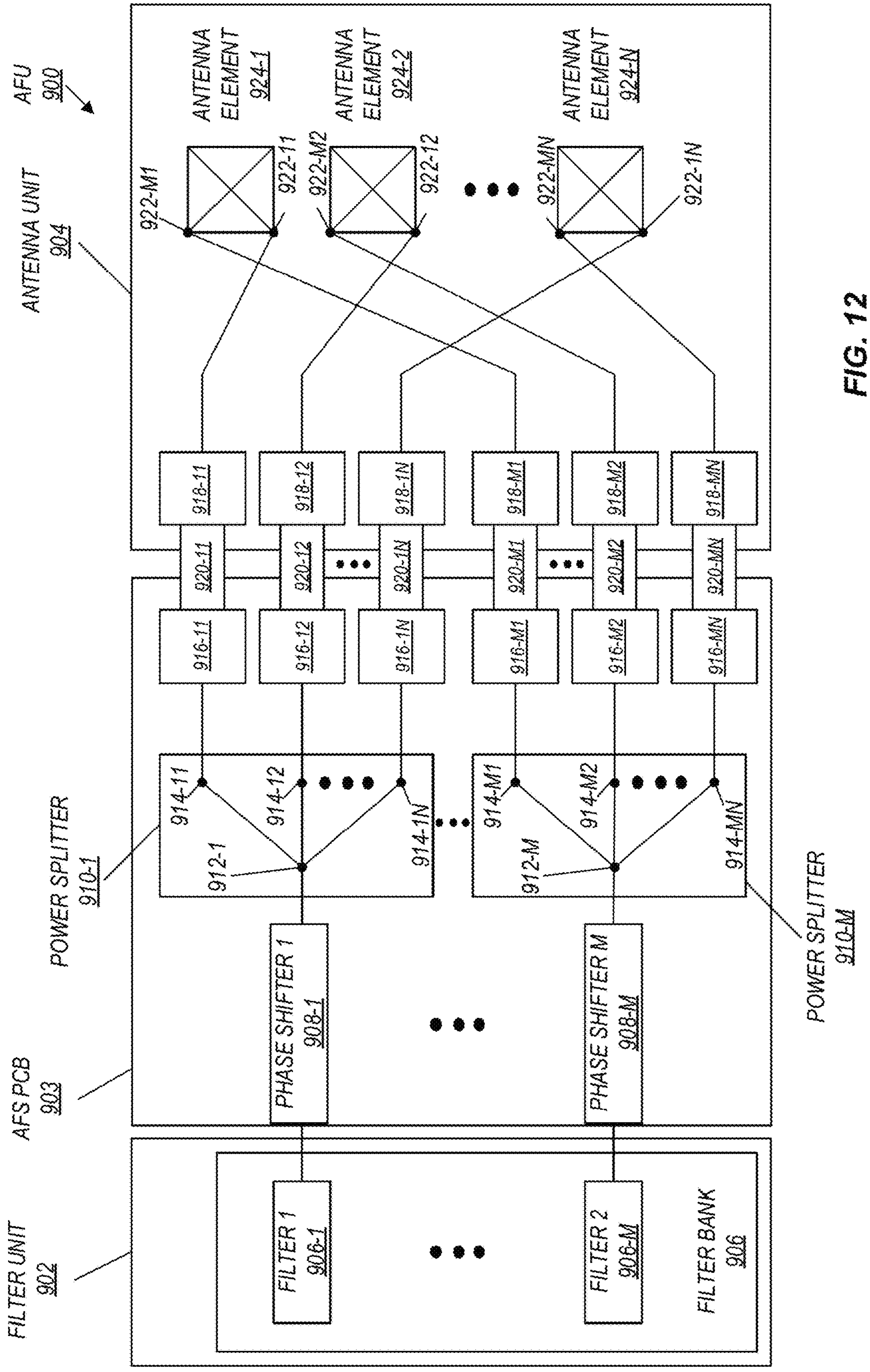
FIG. 12 is a signal diagram representation of the AFU of FIG. 9 in accordance with one embodiment of the present disclosure.

FIG. 12 illustrates is a signal diagram representation of the AFU 900 in accordance with another embodiment of the present disclosure. This example is a generalization of the embodiment of FIG. 9 where there are M antenna branches and each of the phase splitters 910-*m* (for m=1, 2, . . . , M) performs a N way power splitting (i.e., has N split, or output, ports 914-*m*1 to 914-*m*N). Note that "m" is used herein as an antenna, or transmit, branch index and has a value of m=1, . . . , M, and "n" is used herein as a power splitter output port index and has a value of n=1, . . . , N.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. An Antenna and Filter Unit, AFU, for an Advanced Antenna System, AAS, the AFU comprising:
- a first unit comprising:
  - a 1:N power splitter comprising:
    - an input coupled, directly or indirectly, to an antenna port of a filter; and
    - N outputs, where N≥2;
  - N first board-to-board type connectors electrically connected to the N outputs of the 1:N power splitter, respectively;
- a second unit comprising:
  - N second board-to-board type connectors configured to be electrically coupled to the N first board-to-board type connectors, respectively; and
  - N antenna elements coupled, directly or indirectly, to the N second board-to-board connectors, respectively;
- N removable electrically conducting bullets configured to electrically couple the N first board-to-board type connectors and the N second board-to-board type connectors, respectively.

2. The AFU of claim 1 wherein:
- the first unit is a filter unit comprising:
  - the filter having an input electrically coupled to an input port of the AFU and the antenna port coupled to the input of the 1:N power splitter; and
  - a filter printed circuit board, PCB, comprising the 1:N power splitter where an output of the filter is electrically coupled to the input of the 1:N power splitter; and
- the second unit is an antenna unit.

3. The AFU of claim 2 wherein the antenna unit further comprises N signal paths connected between the respective ones of the N second board-to-board connectors and the N antenna elements, each signal path comprising:
- a phase shifter circuit having an input electrically coupled to a respective one of the N outputs of the 1:N power splitter and an output electrically coupled to a respective one of the N first board-to-board type connectors.

4. The AFU of claim 3 wherein the antenna unit further comprises:
- a radome;
- an antenna PCB comprising the N signal paths;
- an antenna backplate; and
- an antenna filter support that mechanically connects the antenna unit and the filter unit.

5. The AFU of claim 1 wherein:
- the first unit comprises:
  - a filter unit comprising a filter having an input electrically coupled to the antenna port of the AFU; and
  - a printed circuit board, PCB, comprising the 1:N power splitter, wherein the input of the 1:N power splitter is configured to be electrically coupled to an output of the filter; and
- the second unit is an antenna unit.

6. The AFU of claim 5 wherein the PCB further comprises:
- a phase shifter circuit comprising:
  - a first terminal configured to be electrically coupled to an output of the filter; and
  - a second terminal coupled to the input of the 1:N power splitter.

7. The AFU of claim 6 wherein the antenna unit further comprises:
- a radome;
- an antenna backplate; and
- an antenna filter support that mechanically connects the antenna unit, the PCB, and the filter unit.

8. The AFU of claim 1 wherein electrical connections formed by the N removable electrically conducting bullets, the N first board-to-board type connectors, and the N second board-to-board type connectors are a primary source of Passive Intermodulation, PIM, distortion in the AAS.

* * * * *